United States Patent
Tarantino et al.

(10) Patent No.: US 9,667,484 B2
(45) Date of Patent: May 30, 2017

(54) DELAYED INCREMENTAL AND ADAPTIVE PROVISIONING OF WIRELESS SERVICES

(71) Applicant: VERIZON PATENT AND LICENSING INC., Arlington, VA (US)

(72) Inventors: Roy Tarantino, S. River, NJ (US); Rachel Ward, Basking Ridge, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 177 days.

(21) Appl. No.: 14/591,293

(22) Filed: Jan. 7, 2015

(65) Prior Publication Data

US 2016/0197777 A1 Jul. 7, 2016

(51) Int. Cl.
*H04L 12/28* (2006.01)
*H04L 12/24* (2006.01)
*H04W 4/00* (2009.01)

(52) U.S. Cl.
CPC ......... *H04L 41/0806* (2013.01); *H04W 4/001* (2013.01)

(58) Field of Classification Search
USPC .......................... 370/230–345; 455/418–435; 709/224–226
See application file for complete search history.

(56) References Cited

U.S. PATENT DOCUMENTS

| 6,628,934 | B2 | 9/2003 | Rosenberg et al. | |
|---|---|---|---|---|
| 8,755,797 | B2* | 6/2014 | Ahmavaara | H04W 8/02 455/435.1 |
| 8,923,853 | B1* | 12/2014 | Shaw | H04W 8/12 455/432.1 |
| 8,948,726 | B2* | 2/2015 | Smith | H04W 8/183 455/406 |
| 9,125,013 | B1* | 9/2015 | Reeves | H04W 12/06 |
| 9,307,561 | B2* | 4/2016 | Vargantwar | H04W 72/04 |
| 2006/0106920 | A1* | 5/2006 | Steeb | G06F 9/5005 709/220 |
| 2011/0244896 | A1* | 10/2011 | Bergink | H04L 12/5895 455/466 |

* cited by examiner

*Primary Examiner* — Man Phan

(57) ABSTRACT

A system and method are described for provisioning a wireless service on a wireless network. The wireless network includes: at least one of an in-network service element and an out-of-network service element; and a provisioning-manager module (SPM) for activating the at least one of the service elements for servicing a user, wherein the SPM counts a number of subscribers of the at least one service element, and performs one of the following: (a) provisions the user, if the number of subscribers is below a threshold count level, or (b) de-provisions another user, if the number of subscribers is above the threshold count level. The SPM only provisions a service element when that service element is requested by the user.

20 Claims, 12 Drawing Sheets

DELAYED INCREMENTAL AND ADAPTIVE PROVISIONING OF WIRELESS SERVICES

BACKGROUND

A communication system can be seen as a facility that enables communication sessions between two or more entities such as user equipment and/or other nodes associated with the communication system. The communication may include, for example, communication of voice, data, multimedia and so on. Communication systems providing wireless communication for communication devices, including user equipment, are known. An example of a wireless system is a cellular network in which a base transceiver station (BTS) or similar access entity serves user equipment (UE) such as mobile stations (MS) via a wireless interface. The operation required for the communication can be controlled by one or several control entities, which may be interconnected. One or more gateway nodes may also be provided for connecting the cellular network to other networks, such as to another cellular system, or to a public switched telephone network (PSTN) and/or other communication networks such as an Internet Protocol (IP) and/or other packet switched data networks.

A cellular network can thus provide access to various services and applications provided by the cellular network, or by entities or networks external to the cellular network. Mobile users connected to a wireless network can access the Internet on a wireless device from any location covered by the network. Wireless networks include Wireless Wide Area Networks (WWANs) based on open wireless standards, such as Time Division Multiplex Access (TDMA) and Code Division Multiplex Access (CDMA), which allow users to roam freely across extensive geographic areas. The WWANs may be operated by a wireless carrier, such as Verizon Wireless®, AT&T Wireless® and Sprint PCS®.

Most mobile users can access the Internet through a WWAN by using a wireless device equipped with a wireless modem and Internet access software. The Internet access software may include a web browser, such as Internet Explorer, available from Microsoft Corporation, or a microbrowser, which is a simpler version of a web browser with reduced graphic capabilities. In addition, the Internet access software may contain a variety of Application Program Interfaces (APIs) and associated applications for formatting and displaying web pages on the wireless device. A web page is a multimedia composition that may contain text, audio, graphics, imagery, video, and nearly any other type of content that may be experienced on a wireless device. A web page may also be interactive and contain user selectable links that cause other web pages to be displayed. A group of one or more interconnected and closely related web pages is referred to as a web site.

A web site has a particular address associated with it called a Uniform Resource Locator (URL). To view a particular web site, users input its corresponding URL on the wireless device, either by typing the UL address on a web browser window, or tapping an icon or menu button on a personal digital assistant (PDA) screen or cellular phone.

To access web pages and other Internet content on a WWAN, users are required to subscribe to a wireless service plan offered by a wireless service provider. A wireless service provider is a company that offers cellular phone service and/or wireless Internet service including e-mail and web access through a WWAN. Examples of wireless service providers offering Internet access include Verizon Wireless®, Sprint PCS® and AT&T Wireless®. The wireless service plans are provided on a monthly or annual fee basis, with the fee depending on the type of services and geographic coverage desired.

Typically, users purchase the service plan at a retail store, or a web site associated with the wireless service provider, or by calling a customer service representative. Users may purchase the service plan together with the wireless device, or after purchasing the wireless device. In addition, users may add or change a service plan at any time after purchase.

To use the services provided in the service plan, users must first activate the services in their wireless devices. The activation process typically requires a series of steps involving the user and the wireless service provider. The steps may include the user providing a unique identification (ID) code associated with the wireless device or wireless modem, selecting a specific service plan, and providing personal and financial information to the wireless service provider for the purposes of billing the service plan. The activation process may also require the user to select a user name and a password for accessing the wireless services. The information may be provided on a web site or by calling a personal customer representative.

Services provided by the cellular network often require support from other network entities, or elements. For example, in order for a subscriber to use a Navigation application, the subscriber's account must be set up, or provisioned to use several network elements, such as a data gateway, a messaging server, a Location Proxy Server (LPS) and other elements.

Some of the elements that are included in a wireless service are hosted and maintained within the cellular network infrastructure and are known as in-network servers (also referred to as in-network elements). Other elements are hosted and maintained by third party partners, known as Application Service Providers (ASPs) (also referred to as out-of-network elements). In-network elements hosted within the cellular network are usually purchased from vendors and are licensed for a given number of subscribers. Usually, license costs are based on tiers of subscriber quantities. The following is an example of a typical cost structure for an in-network element:

Initial cost: $1.5 M includes a license for 100,000 users

| | |
|---|---|
| 100,001-500,000 users | $100,000 |
| 500,001-1,500,000 users | $200,000 |
| 1,500,001-3,000,000 users | $250,000 |
| 3,000,001-10,000,000 users | $350,000 |

For out-of-network elements hosted by ASPs, costs are usually based on the number of subscribers, and the in-network provider is charged by the month per subscriber. An example of a typical fee schedule for an ASP is shown below:

| Subscribers | Monthly Subscriber Pricing |
|---|---|
| 0-1,000,000 | $1.35 |
| 1,000,001-1,500,000 | $1.30 |
| 1,500,001-2,000,000 | $1.25 |
| 2,000,001-2,500,000 | $1.20 |
| 2,500,001-3,000,000 | $1.15 |
| 3,000,001-3,500,000 | $1.10 |
| 3,500,001-4,000,000 | $1.00 |
| 4,500,001-5,000,000 | $0.80 |
| >5,000,001 | $0.75 |

Once a customer activates a new mobile device and subscribes to a wireless service (for example, Verizon Wireless®), a service provisioning process sends transactions to activate or provision the user on the in-network elements and the out-of-network ASP based servers. Once the customer is provisioned, the service can be used by the customer and the wireless service is charged according to the licensing and subscriber pricing tables, as shown above.

Conventionally, all provisioning occurs up front at the time of device activation and when the customer subscribes. The costs to the wireless service provider are also incurred at this time. The ASP starts charging the wireless service provider for the customer after provisioning, and the license count is incremented on all server elements, regardless of whether or not the customer uses the service. This is an unnecessary cost to the wireless service provider.

In addition, the in-network service provider may not use all of the elements that are supported by the in-network provider. For example, unless the service provider actually sends a message to an element requiring a gateway element, the gateway element is not used. Because all elements are provisioned up front, however, licensing costs are incurred for all elements even if features within the service that actually require the element are never used.

In many cases, a customer likely makes the most use of a service soon after he/she subscribes to the service. Over time, the usage level drops off and the customer may rarely, or may never use the service again; the customer, however, remains subscribed. With this usage pattern, inactive subscribers remain provisioned, even though the service is not used. The licensing costs to the wireless service, as shown above (for example), continue to be incurred.

As will be described below, an aspect of the present application addresses service provisioning implemented by a cellular provider (such as Verizon Wireless®) which improves upon the aforementioned aspects of conventional service provisioning. Such improvements include delayed, incremental and adaptive provisioning of wireless services that result in lower service costs to the cellular provider.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

An aspect of the present application defines a method to reduce costs to a wireless service provider by utilizing dynamic service provisioning using the following principles:
1. Delayed provisioning: Only provision a service element to the subscriber when the service element is first used by the subscriber.
2. Incremental provisioning: Only provision service elements to the subscriber that are actually required for the features used by the subscriber.
3. Adaptive provisioning: Remove the subscriber from the service element, or de-provision the subscriber, if the service or service feature is not used for a defined period of time.

Figure 1:
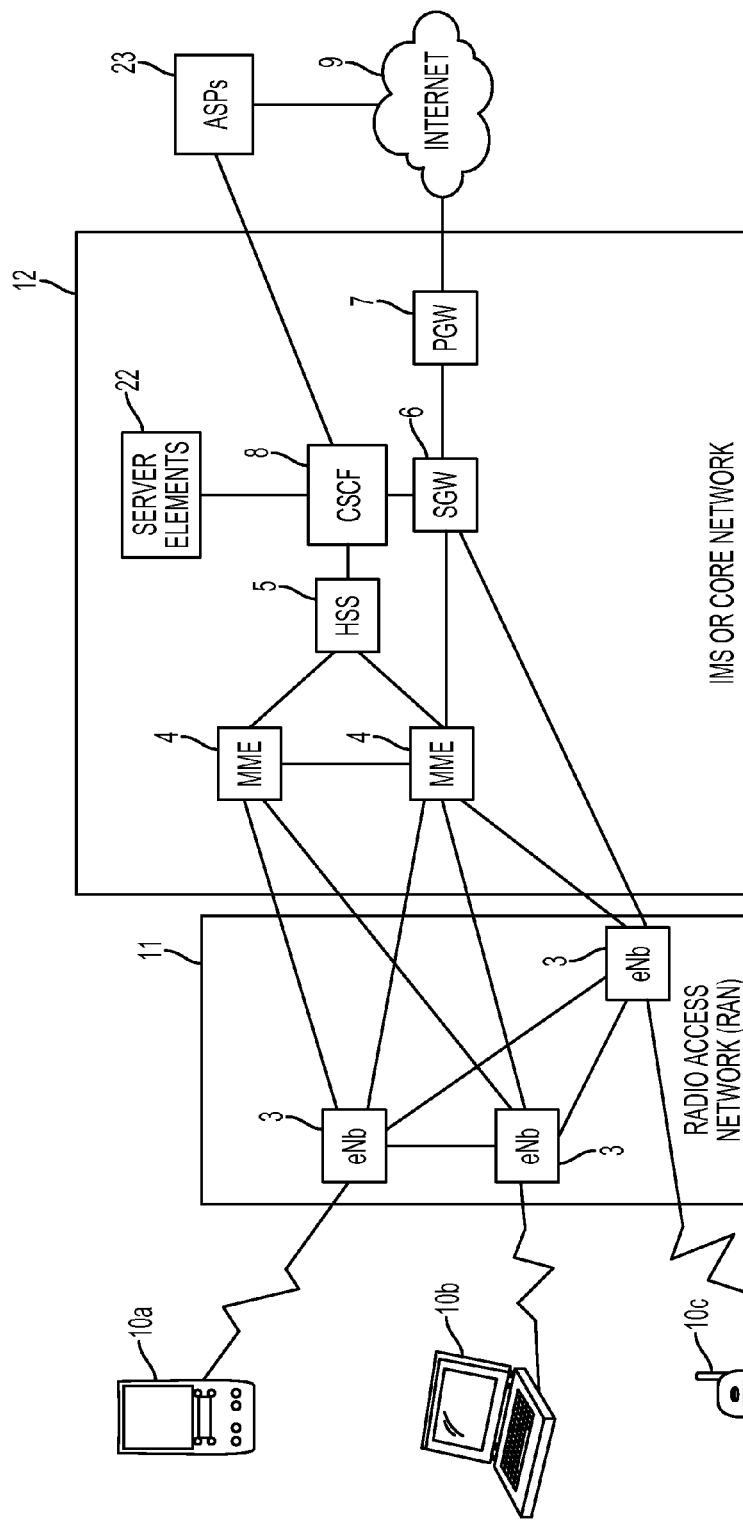
FIG. 1 is a block diagram of a cellular network architecture that includes in-network elements (or servers) and out-of-network elements (or Application Service Providers (ASPs)).

Referring first to FIG. 1, an example of a network environment, in which the aforementioned service provisioning principles can operate, will now be described. As shown, mobile devices 10a, 10b and 10c are equipped with a wireless modem and Internet access software to connect to Internet 9 by way of a Radio Access Network (RAN) 11 and a Core Network 12 (also referred to herein as an IP Multimedia System (IMS)). In general, the mobile devices depicted in FIG. 1 may include a personal digital assistant (PDA) 10a, a portable computer 10b, and a cellular phone 10c.

The Internet access software may include a web browser, such as Internet Explorer, and a variety of Application Program Interfaces (APIs) and associated applications for formatting and displaying web pages on the mobile devices. To access the web pages and other Internet content, via RAN 11 and Core Network 12, users of mobile devices 10a-c are required to subscribe to a wireless service plan offered by a wireless service provider. The wireless service plans are provided on a fee basis, with the fee depending on the type and number of services and geographic coverage desired. Typically, users of mobile devices 10a-c purchase the service plan at a retail store, or at a web site associated with the wireless service provider; the service plan may also be purchased by calling a customer service representative. Users of the mobile devices may purchase the service plan together with the purchase of the mobile devices. In addition, users of the mobile devices may add or change a service plan at any time after purchase.

It will be understood that mobile devices other than mobile devices 10a-c may be used to access voice, data, and Internet content via RAN 11 and Core Network 12. Furthermore, wireless services may be automatically activated on any wireless device capable of accessing a wireless network, including a wireless personal area network (WPAN), a wireless local area network (WLAN), or a wireless wide area network (WWAN).

Returning now to the block diagram depicted in FIG. 1, there is illustrated a Long Term Evolution (LTE) Network architecture, which uses standards for mobile telecommunication systems defined by a standardization entity. As shown, RAN 11 includes three enhanced Node Bs (eNodeBs or eNBs), each designated as 3. The Core Network includes a Mobility Management Entity (MME) 4, a Home Subscriber Service (HSS) 5, a Serving Gateway (SGW) 6 and a Packet Gateway (PGW) 7.

The mobile devices 10a-c communicate over an air path interface to the eNodeBs, residing in RAN 11. Each eNodeB manages a radio path and hosts the radio link control and medium access control functions. Each eNodeB also encrypts and decrypts data and handles radio resource management.

The MME 4, residing in Core Network 12, is responsible for managing the non access stratum (NAS) control messages from/to mobile devices 10a-c. In addition, MME 4 plays a role in selecting an SGW 6 for user traffic, coordinates handover in the LTE network and establishes the necessary connections to HSS 5 for authentication and security procedures. The HSS 5 also maintains each subscriber's profile and subscription data, as well as subscriber identifiers (e.g. International Mobile Subscriber Identity (IMSI) and Mobile Subscriber Integrated Services Digital Network Number (MSISDN)) and subscriber authentication and security data. The SGW 6 is the endpoint of user connections from an eNodeB 3. The SGW 6 also manages charging features and Quality of Service (QoS) handling. The PGW 7 is the network node that provides an interface between Core Network 12 and external networks, such as Internet 9.

Continuing the description of FIG. 1, the architecture includes in-network elements or server elements, generally designated as 22, and out-of-network elements or ASPs, generally designated as 23. The in-network elements 22 are hosted and maintained by Core Network 12, which is operated by a cellular provider, such as Verizon Wireless®. The in-network server elements 22 and the out-of-network elements (ASPs) 23 communicate with a Call Service Control Function (CSCF) entity, designated as 8. The CSCF controls these elements based on service subscriptions from different users. In order to request service from an element or multiple elements, a user typically needs to have a subscription to the service and generally needs to be registered in the Core Network, or IMS. Information about the subscribers (subscribers' profiles) is stored in HSS 5 and the control entity to the various server elements and ASPs is provided by CSCF 8.

In connection with Network 12, a session initiation protocol is used, for example, for registering to the CSCF and for setting up sessions. The term session refers to any communication a user may have, such as a call, web browsing, and so on. For enabling end-to-end connectivity between a user and a server element, a variety of different registries need to be provisioned. Provisioning refers to submitting user profile information defining access to services and settings for the services into information registers.

Figure 4:
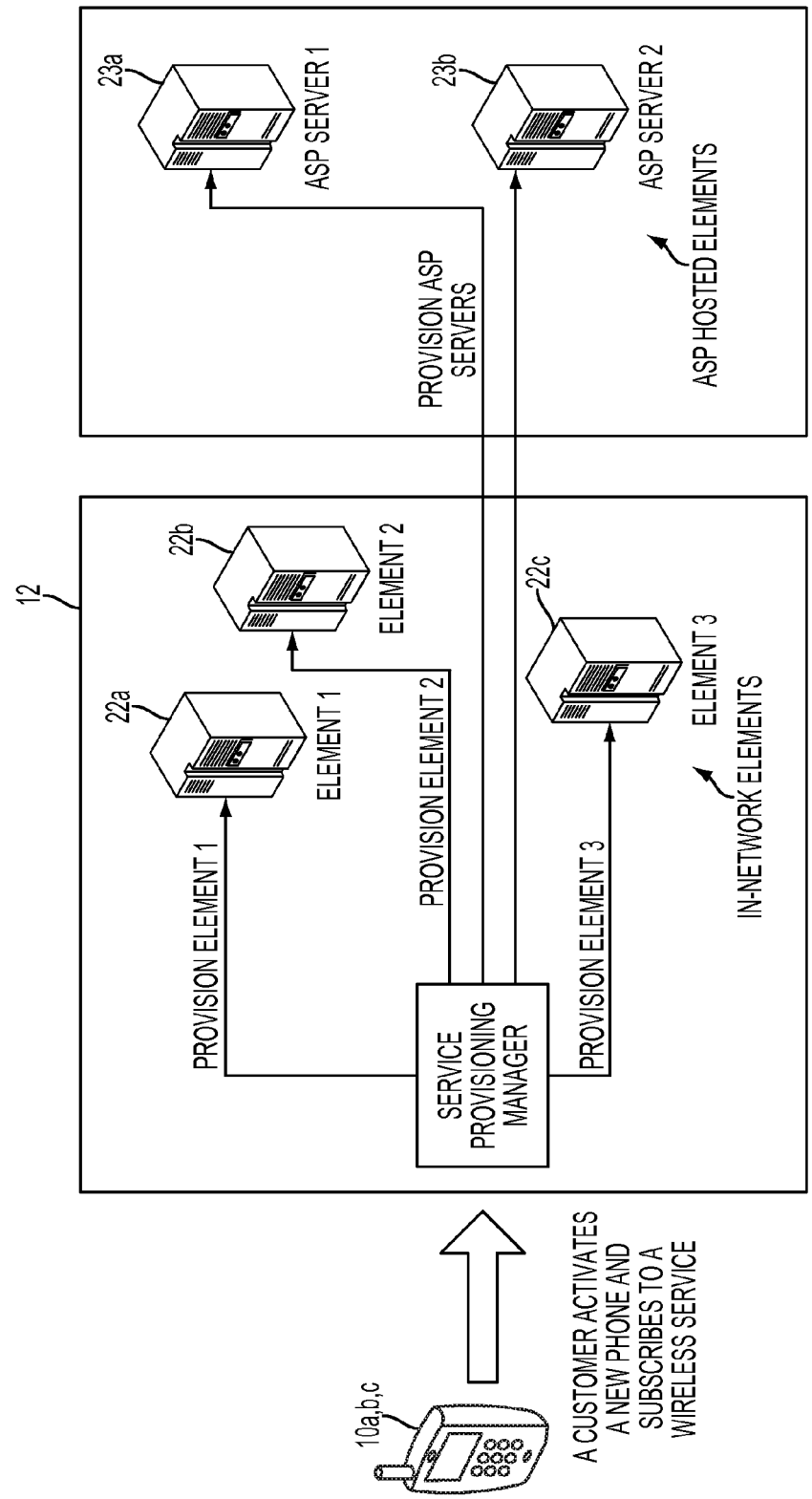
FIG. 4 is a block diagram showing parties and relationships involved in provisioning in-network elements (or servers) and out-of-network ASPs.

The CSCF 8 includes a Service Provisioning Manager (SPM) (shown in FIG. 4 as SPM 25). The SPM receives orders from a customer activating a new mobile device 10a-c and provisions, or sets up the customer for desired services. The SPM 25 has a knowledge base of services and the various server elements and ASPs that make up the functions of a particular service. The customer may order services through SPM 25 from a Point-of-Sale (POS) location, or from a web-page on his/her mobile device, such as a MyVerizon® webpage (for example). More details of SPM 25 will be provided later.

Before describing provisioning control through the SPM, various functions of mobile devices, such as devices 10a-c, are now described by reference to FIGS. 2 and 3. For a given communication, an application program within the mobile device or the web browser executing on mobile devices 10a-c may be considered a 'client', and programming within Networks 11 and 12 may be considered a 'server' application for the particular communication. It may be useful to consider the functional aspects of two types of mobile devices at a high level.

Figure 2:
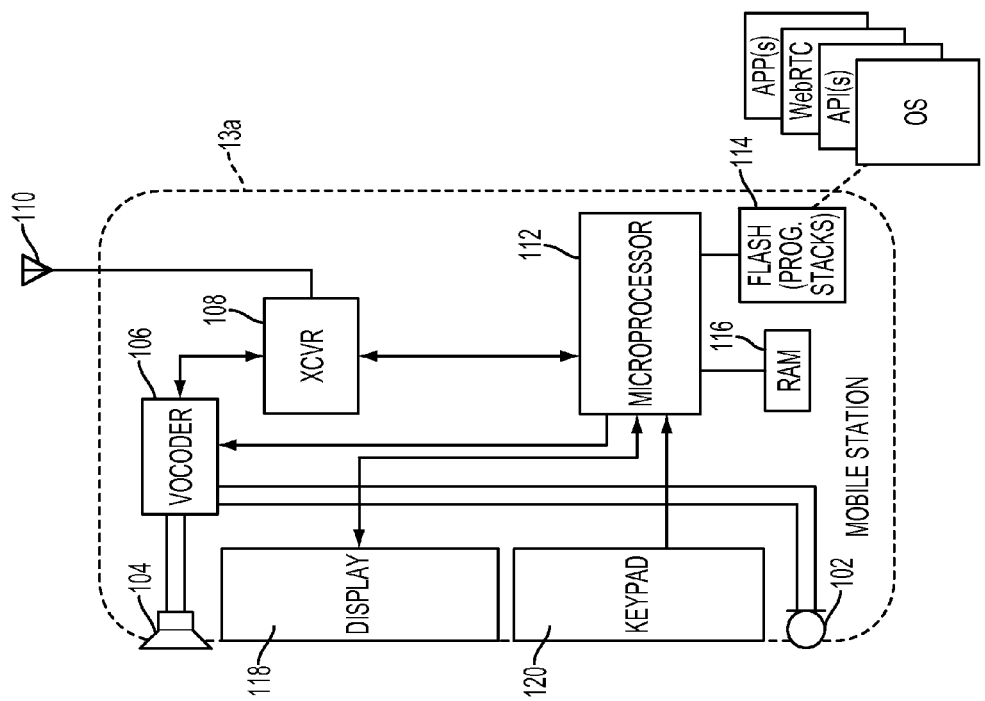

FIG. 2 provides a block diagram illustration of an example of a non-touch type mobile device 13a. Although the mobile device 13a may be a smart-phone or may be incorporated into another device, such as a personal digital assistant (PDA) or the like, for discussion purposes, the illustration shows the mobile device 13a in the form of a handset. The handset embodiment of mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, including wireless data communications, the mobile device 13a also includes at least one digital transceiver (XCVR) 108. The mobile device 13a is configured for digital wireless communications using one or more of the common network technology types. The mobile device 13a may also be capable of analog operation via a legacy network technology.

The transceiver 108 provides two-way wireless communication of information, such as vocoded speech samples and/or digital information, in accordance with the technology of Networks 11 and 12. The transceiver 108 also sends and receives a variety of messages in support of the various voice and data services provided via mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers, etc. A keypad 120 enables dialing digits for voice and/or data calls as well as generating input selection, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input/output elements of the graphical user interface (GUI), for multimedia (e.g., audio and/or video) communications. Of course other user interface elements may be used, such as a trackball, as in some types of PDAs or smart phones.

A microprocessor 112 serves as a programmable controller for mobile device 13a, in that it controls all operations of the device in accord with programming that it executes for all operations. In the example, mobile device 13a includes flash type program memory 114 for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, application programming interface(s) (APIs), call processing software, and vocoder control software, and any of a wide variety of other applications, such as client browser software and short message service software, any of which may operate with active user intervention or in the background without user intervention. The APIs include control messages (e.g. protocol(s) supported on the IMS) for generating, delivering, receiving, and processing messages. The memories 114, 116 also store various data, such as telephone numbers and server addresses, downloaded data such as multimedia content, and various data inputted by a user. Programming stored in the flash type program memory 114, sometimes referred to as "firmware," is loaded into and executed by microprocessor 112.

Figure 3:
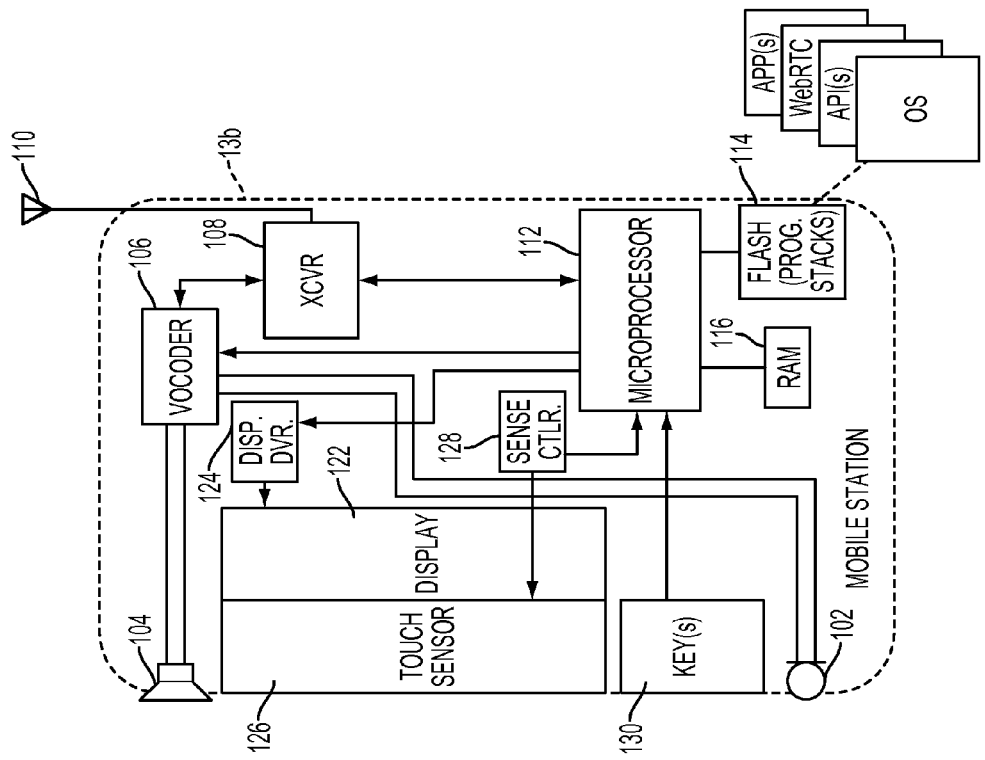
FIGS. 2 and 3 are block diagrams of example User Equipment (UE) devices.

FIG. 3 provides a block diagram illustration of an example of a touch screen type mobile device 13b. Although possibly configured somewhat differently, at least logically, a number of the elements of the touch screen type mobile device 13b are similar to the elements of mobile device 13a, and are identified by like reference numbers in FIG. 3. For example, the touch screen type mobile device 13b includes microphone 102, speaker 104 and vocoder 106 for audio input and output functions, much like in the earlier example. The mobile device 13b also includes at least one digital transceiver (XCVR) 108 for digital wireless communications. The concepts discussed here encompass embodiments of mobile device 13b utilizing any digital transceivers that conform to current or future developed digital wireless communication standards. As in mobile device 13a, transceiver 108 provides two-way wireless communication of information, such as vocoded speech samples and/or digital information. The transceiver 108 also sends and receives a variety of messages in support of the various voice and data services provided via mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of mobile device 13a, a microprocessor 112 serves as a programmable controller for mobile device 13b, in that it controls all operations of mobile device 13b in accord with programming that it executes for all operations. In the example, mobile device 13b includes flash type program memory 114 for storage of various program routines and mobile configuration settings. The mobile device 13b may also include a non-volatile random access memory (RAM) 116 for a working data processing memory. Of course, other storage devices or configurations may be added to or substituted for those in the example. Similar to the implementation of mobile device 13a, the flash type program memory 114 stores firmware such as a boot routine, device driver software, an operating system, API(s), call processing software, and vocoder control software, and any of a wide variety of other applications, such as client browser software and short message service software, any of which may operate with active user intervention or in the background without user intervention. The APIs include control messages for generating, delivering, receiving, and processing signaling messages with and/or via a network, such as Core Network 12.

In the example of FIG. 2, the user interface components include a display and a keypad. The mobile device 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 13b in the example includes a display 122, which microprocessor 112 controls via a display driver 124, to present visible outputs to the device user. The mobile device 13b also includes a touch/position sensor 126. The sensor 126 is relatively transparent, so that the user may view the information presented on display 122. A sense circuit 128 sensing signals from elements of touch/position sensor 126 detects occurrence and position of each touch of the screen formed by display 122 and sensor 126. The sense circuit 128 provides touch position information to microprocessor 112, which can correlate that information to the information currently displayed via display 122 to determine the nature of user input via the screen.

The display 122 and touch sensor 126 (and possibly one or more keys 130, if included) are the physical elements providing the textual and graphical user interface for mobile device 13b. The microphone 102 and speaker 104 may be used as additional user interface elements for audio input and output.

Referring next to FIG. 4, an illustration is shown of the parties and relationships involved in providing and automatically activating wireless services to mobile devices in accordance with an aspect of the application. A service provider of Core Network 12 may allocate a number of IP addresses for distribution to mobile devices 10a-c. An IP address is assigned to the mobile device in order to access the wireless services provided by the service provider. A service provisioning manager (SPM) 25 is maintained by the service provider to allow mobile device 10a-c to select a wireless service plan for accessing voice, data and Internet content. The wireless service plan specifies the wireless services available to the mobile device user, as well as the fees associated with the service plan. When selecting the service plan, the mobile device user is required to submit personal and financial information for billing purposes. The mobile device user may also be asked to select a username and password for accessing the wireless services on the mobile device. Additionally, the mobile device user enters device-specific information to identify the mobile device for which the wireless services are to be activated. The device-specific information may include the serial number of the mobile device, the modem equipment identifier (EID), or any other identification information associated with the mobile device and understood by the SPM.

The SPM 25 handles the request submitted by the mobile device, which includes device-specific information and user-specific information. The user-specific information is stored in a user database (not shown) associated with a billing server (not shown). The billing server handles the billing and payment of the service fees charged by the wireless service provider. To activate a wireless service on the mobile device, SPM 25 registers the mobile device with each application server or service element responsible for providing some or all of the features comprising a service desired by the user. The SPM polls the record associated with the mobile device user from the user database (not shown) and registers the record with one or more of the application servers or service elements. For example, SPM 25 may send the record to a wireless e-mail server (for example, ASP 23a) to register a new wireless e-mail account for the mobile device user.

Continuing the description of FIG. 4, SPM 25 provisions, as necessary, the illustrated in-network servers, namely, element 1 (22a), element 2 (22b) and element 3 (22c). The SPM 25 also provisions, as necessary, the out-of-network servers, namely ASP server 1 (23a) and ASP server 2 (23b). For example, if the service plan desired by a user requires features residing in all three elements 1-3, then SPM 25 will provision all three elements 1-3.

The SPM 25, in a sense, provides a virtual folder of services to the mobile device users. For example, two services may be WORD2000™ and WordPerfect™ processing software packages. As shown, the user launches a browser to an enrollment page to subscribe to a service, as shown in step 71 in FIG. 7, by using his/her web site on a mobile device or by running an application on the device. For example, the user may connect to the network with a device with limited display rendering capabilities. In that case, the user would need more document processing done by network elements 22b and 22c to render the document for display on the device. All three in-network elements, 22a-c, of the Core Network (12) would be required for the service. On the other hand, the user may connect with a high function capable device and not need network based display rendering and only require one service element. In this case, SPM 25 may only need to provision one in-network server, namely, element 1 (22a). Another service requested by the user may be, for example, navigation services offered by an out-of-network ASP, namely, ASP server 1 (23a). In this situation, SPM 25 only needs to provision ASP server 1 and no other out-of-network servers.

Figure 5:
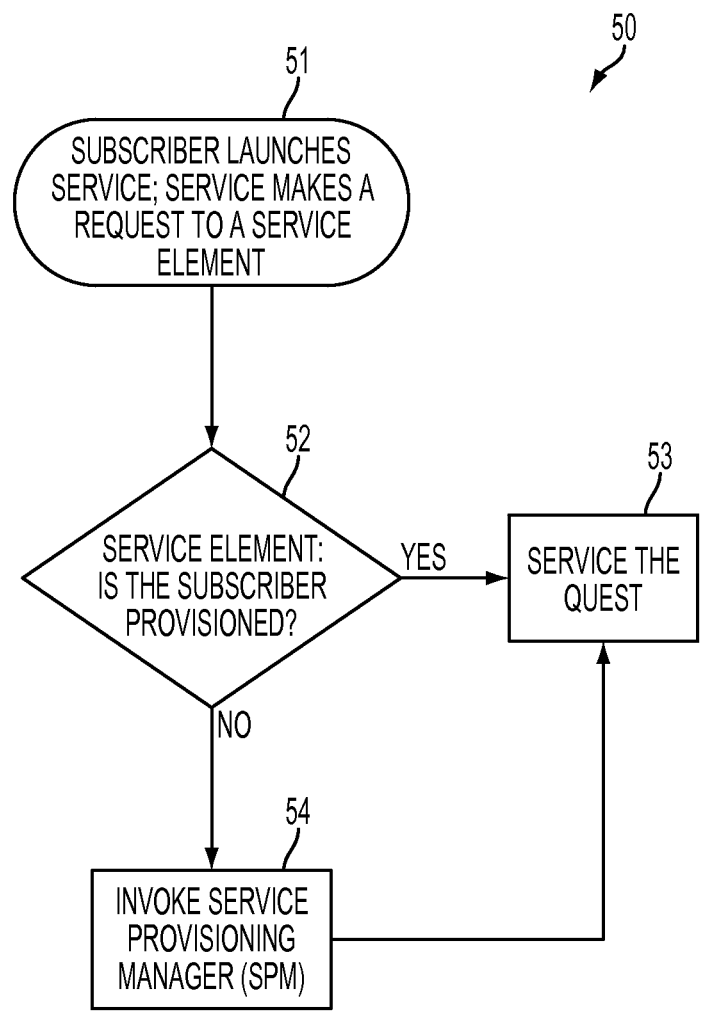
FIGS. 5 and 6 are examples of a process for provisioning in-network elements (or servers) and out-of-network ASPs, in accordance with an aspect of the application.
Figure 6:
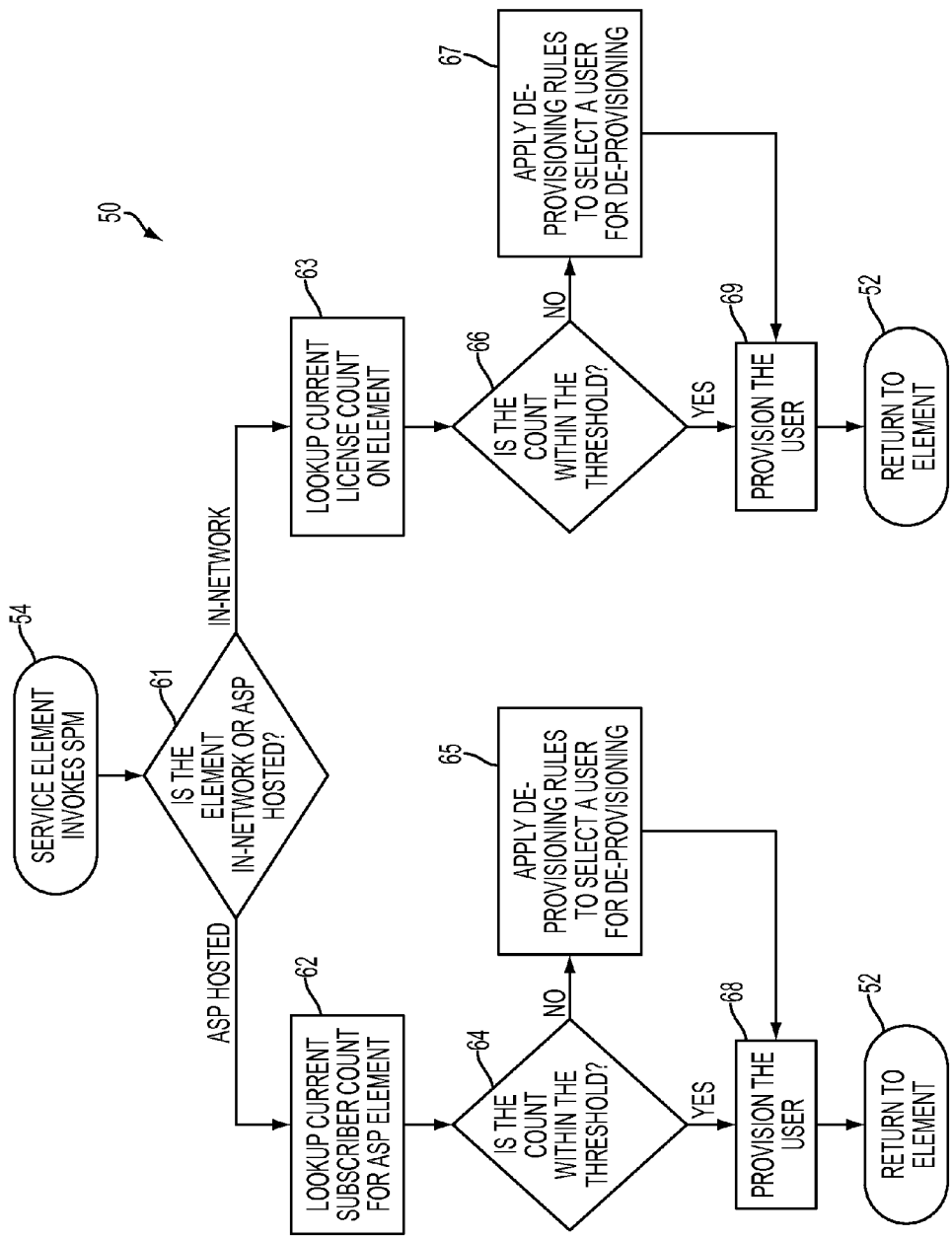
Figure 7:
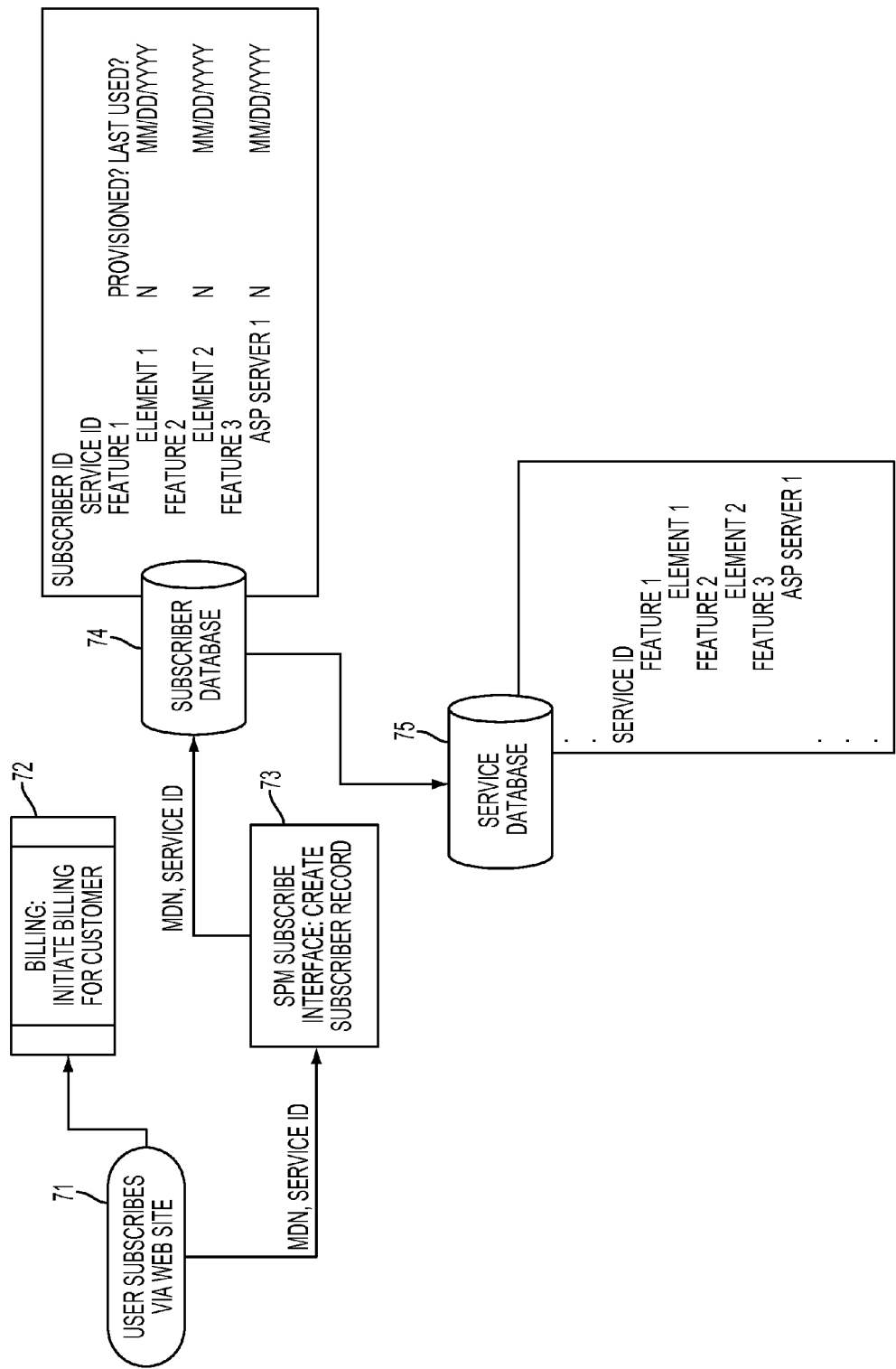
FIG. 7 is an example of a customer signing up for a desired service plan that includes three features implemented by two in-network elements and one out-of-network ASP, in accordance with an aspect of the application.

Referring next to FIGS. 5, 6 and 7, an example is illustrated of a customer signing up for a service plan that includes three features implemented by Core Network 12. The three features are implemented by elements shown in FIG. 4 including two in-network elements, namely, elements 1 and 2, and one out-of-network element, namely, ASP server 1. As shown, the user launches a browser to an enrollment page to subscribe to a service in step 71 in FIG. 7, by using his/her web site on a mobile device or by running an application on the device. As described before, a billing server receives and stores personal and financial information about the subscriber and initiates billing for the subscriber (step 72). The SPM acts as an interface between the subscriber and a subscriber database 74; the SPM receives information about the subscriber's mobile device, such as the MDN and the Service ID associated with the desired service plan. Step 73 then creates a record for the subscriber in subscriber database 74. The record may take the form shown in FIG. 7, in which the service ID is associated with the subscriber ID; and the service ID identifies features 1 through 3, respectively, associated with elements 1, 2 and ASP server 1, as shown in subscriber database 74. In addition, the subscriber database correlates a date associated with the last time a respective feature was used by the subscriber. Since the subscriber is new, the features have never been previously provisioned and have never been previously used. Finally, the service database 75 is referenced by the subscriber record in the subscriber database 74 to allow the SPM, at service launch and service maintenance times, to assess details about service elements for a specific feature.

Returning now to FIG. 5, a user via a mobile device (for example, 10a, b, c) makes a request in step 51 to a service element (for example 22a, b, c). When the user launches or runs the service the service makes a request to a service element. The service element (for example 22a) invokes decision box 52. As shown, a decision box 52 determines whether the service element has been provisioned (provisioning is explained in FIG. 6 below). If the subscriber has been provisioned then decision box 52 branches to step 53, and enables the element to service the request via step 53. If the subscriber has not been provisioned with the appropriate service element, however, then decision box 52 branches to step 54, in order to invoke the SPM to perform the steps shown in FIG. 6.

Referring now to FIG. 6, after being invoked, SPM 25 enters a decision box 61 and determines whether the element being considered for provisioning is an in-network server (element), or an out-of-network ASP. If it is determined that the element is in-network, the SPM invokes step 63, and examines the current license count on the element considered for provisioning. Recall that network elements hosted within a cellular network, such as Core Network 12, are usually licensed at different thresholds based on the number of subscribers. Generally, the license costs are based on tiers of subscriber quantities. The following is a typical cost structure, for example, for an in-network server or element:

Initial cost $1.5 M includes a license for 100,000 users:

| | |
|---|---|
| 100,001-500,000 users | $100,000 |
| 500,001-1,500,000 users | $200,000 |
| 1,500,001-3,000,000 users | $250,000 |
| 3,000,001-10,000,000 users | $350,000 |

Examining the license count, SPM 25 enters a decision box 66 and determines whether the count of subscribers is within a specific threshold shown in the aforementioned table. If the count is within the specific threshold, then the SPM branches to step 69 and provisions the user. The process 58 then returns to step 52 shown in FIG. 5. The user can now communicate directly with the provisioned service element.

If, on the other hand, the SPM determines that the subscriber count is not within the threshold, i.e. it is above a specific threshold, step 67 is entered. Step 67 de-provisions another user in order to make room for the user requesting the service element. A method of de-provisioning another user is described later. The SPM then enters step 69 and provisions the requesting user. The process then returns to step 52 shown in FIG. 5. The user can now communicated directly with the provisioned service element.

Returning to decision box 61 in FIG. 6, the SPM determines whether the element being considered for provisioning is an in-network server (element), or an out-of-network ASP. If it is determined that the element is an out-of-network ASP hosted server, the SPM invokes step 62. As shown, step 62 examines the current subscriber count on the element considered for provisioning. Recall that for out-of-network elements hosted by ASPs, the costs are usually based on the number of subscribers and the in-network provider is charged by the month per subscriber. An example of a typical fee schedule for an ASP is shown below:

| Subscribers | Monthly Subscriber Pricing |
|---|---|
| 0-1,000,000 | $1.35 |
| 1,000,001-1,500,000 | $1.30 |
| 1,500,001-2,000,000 | $1.25 |
| 2,000,001-2,500,000 | $1.20 |
| 2,500,001-3,000,000 | $1.15 |
| 3,000,001-3,500,000 | $1.10 |
| 3,500,001-4,000,000 | $1.00 |
| 4,500,001-5,000,000 | $0.80 |
| >5,000,001 | $0.75 |

From step 62, the SPM invokes a decision box 64 and determines whether the count of subscribers is within a specific threshold shown in the aforementioned table. If the count is within the specific threshold, then the SPM invokes step 68 and provisions the user. The process then returns to step 52 shown in FIG. 5.

If, on the other hand, the SPM determines that the subscriber count is not within the threshold, i.e. it is above a specific threshold, the SPM invokes step 65, and de-provisions another user in order to make room for the user requesting the service element. A method of de-provisioning another user is described later. The SPM then invokes step 68 and provisions the requesting user. The process then returns to step 52 shown in FIG. 5.

De-provisioning policy rules are applied whenever existing users need to be selected for de-provisioning to make room for new users. The object is to avoid crossing user or license thresholds and, thereby, minimize the cost of the service to the service provider. De-provisioning policy rules are applied by the SPM, as shown by steps 65 and 67 in FIG. 6, and step 87 in FIG. 8B, and FIG. 8C. The rules may take into consideration: (a) how long ago was the service or feature used, (b) the service usage pattern of the user, (c) the type of user (i.e. higher priority given to enterprise customers or customers paying a premium over consumer customers, and (d) other services to which the user may be subscribed. In addition the rules may be customized by service or service element type. For example, there may be different rules for in-network elements and other rules for ASP hosted elements.

Turning now to FIG. 7, an example is shown of a customer signing up for a service plan that includes three features 1, 2, and 3 implemented by two in-network elements, namely elements 1 and 2, and one out-of-network server, namely ASP server 1. The user accesses the service's web-pages (for example) on the mobile device and signs up for a wireless service plan offered by a wireless service provider, for example, Verizon Wireless®. A billing server, designated as 72, initiates billing for the subscribing customer. The billing server receives and stores personal and financial information about the subscriber and initiates billing for the subscriber. A subscriber interface module 73 in SPM 25 creates a subscriber record using the specific ID of the customer and associates that specific ID with the service ID. The information is entered into a subscriber database 74, which tabulates the subscriber's identity, the service's identity, and the features associated with the service. A similar description is also entered into the service's database 75, which tabulates that the services of feature 1, feature 2 and feature 3 are requested. Features 1 and 2 are in-network and feature 3 is out-of-network, as shown.

The SPM 25 also creates, in subscriber database 74, a last-used date for each feature in the service. The dates for last usage of each feature are shown tabulated in the subscriber's database 74. Since the customer is now subscribing for the first time, the table in subscriber's database 74 shows that the features in server elements 1, 2 and 3 have not been previously provisioned or previously used. The last-used date may be used as a criteria for possible de-provisioning according to the de-provisioning policy rules.

Figure 8A:
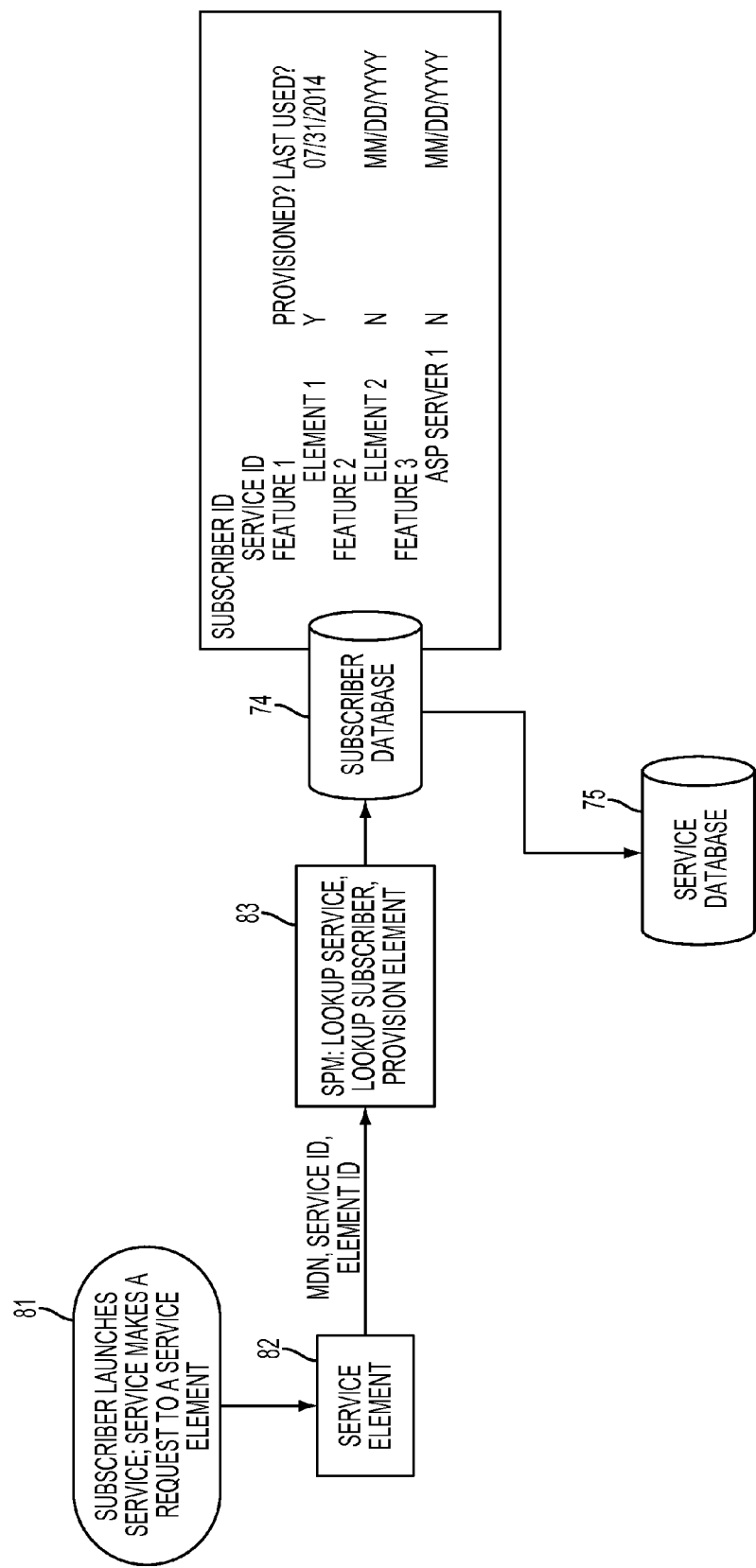
FIG. 8A is an example of a delayed or incremental provisioning method, that is called upon by the system of FIG. 4, when a customer is requesting a specific service, in accordance with an aspect of the application.
Figure 8B:
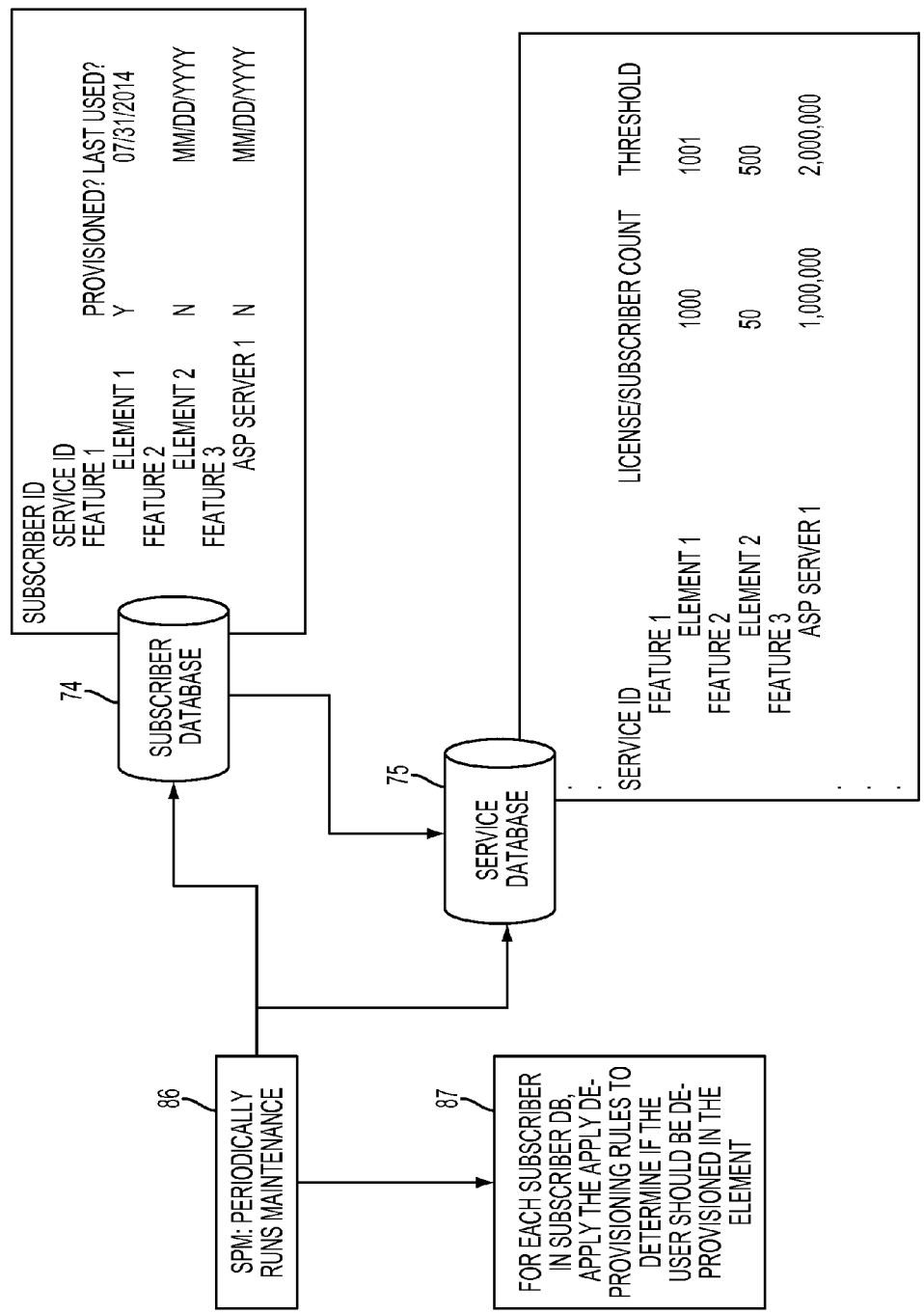
FIG. 8B is an example of an adaptive provisioning method, that is called upon by the system of FIG. 4 to de-provision an element or an ASP, in accordance with an aspect of the application.

Referring next to FIGS. 8A and 8B, there are shown a delayed-incremental method (FIG. 8A) and an adaptive provisioning method (FIG. 8B). The adaptive provisioning method executes a de-provisioning of a subscriber per feature, according to de-provisioning policy rules, i.e., when that feature has not been used by a subscriber for a predetermined time period. The delayed-incremental provisioning method executes provisioning of a feature, only when that feature is being requested by the customer. Referring first to FIG. 8A, the customer launches a service from a mobile device that he/she has previously subscribed to, as shown in step 81. As an example, a Navigation Application in the mobile device may include traffic reports as an added feature, in which navigation (feature 1) is supported by element 1, and traffic (feature 3) is delivered by ASP server 1. For this example, the user has subscribed to both features and has used navigation but not traffic reports. Upon first use of traffic reports the service element (in this case ASP server) in step 82 queries its internal database and determines that the user has not been provisioned for traffic (features 3). The service element then calls the SPM 25 via the service element's interface to the SPM, and sends the user's MDN, the service's ID, and the service element's ID. The SPM determines if the user has subscribed to the traffic reports. Since the answer is 'yes', the SPM next looks up the feature in service database 75 to confirm the element and feature being requested (ASP server 1, Traffic Reports). The SPM then provisions the element (in this example, feature 3 of ASP Server 1) using process 50, shown in FIGS. 5 and 6. The subscriber's database 74 is updated, now showing feature 3 of ASP Server 1 provisioned on Jul. 31, 2014 (now the last date used). Feature 2, Element 2 is not provisioned.

Thus, an element is not provisioned until the subscriber uses the feature delivered by ASP Server 1. If the subscriber does use a feature supported by additional elements, the SPM will only provision those additional elements when needed.

Referring next to FIG. 8B, there is shown an adaptive provisioning method. As shown, SPM 25 periodically runs a maintenance service by entering step 86, for example, during each night or some other predetermined interval. Step 86 runs the nightly maintenance and enters step 87 for each subscriber in the subscriber's database 74 and for each server element in the service database 75. The method applies the de-provisioning policy rules to determine whether a subscriber should be de-provisioned from the element, by using process 50 in accordance with FIG. 6. This maintenance service may be performed late into the night during off-peak activity.

Depending on the result of applying the de-provisioning policy rules, the SPM 25 determines if the subscriber should be de-provisioned from the service element and/or the ASP server. Note that features 2 and 3 are far below the threshold count levels and, thus, do not need to be de-provisioned. Feature 1, however, is very close to the threshold count level and should be de-provisioned from the user, assuming the de-provisioning policy rules include a rule whereby a user is de-provisioned for the feature if they did not use feature 1 for a week (for example).

Figure 8C:
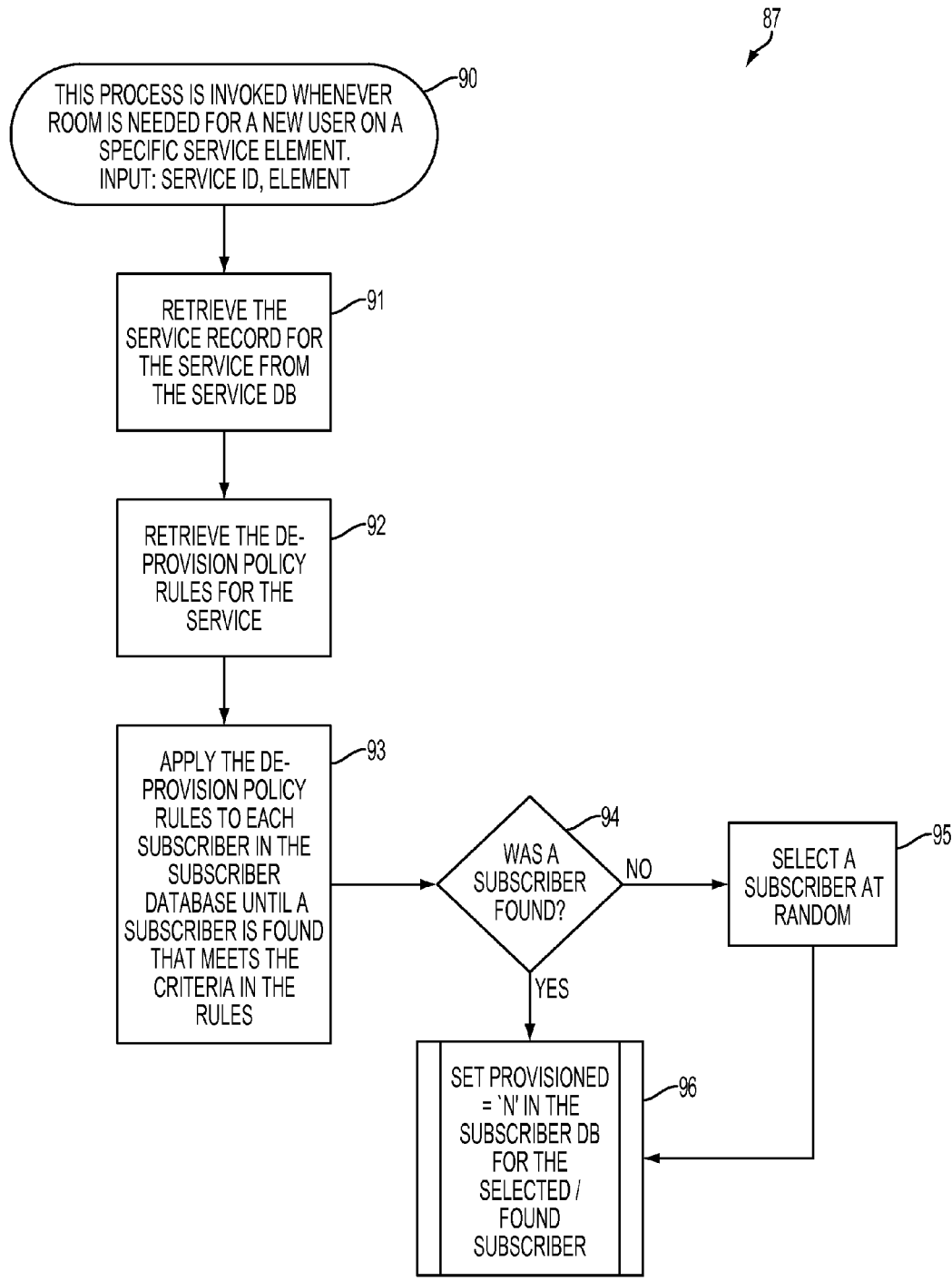
FIG. 8C is an example of a de-provisioning method, in which a subscriber is de-provisioned, whenever room is needed for a new user requesting a particular service element.

Turning now to FIG. 8C, process 90 is invoked, whenever room is needed for a new user requesting a specific service element. Entering step 91, the process retrieves the service record for the element, stored in the service database 75 and applies the de-provisioning policy rules. The service database 75 includes a provisioning expiry-date that identifies when provisioning of the particular element is to expire and in the example is used by the de-provisioning policy rules. This may include a time period, for example, one week, or two weeks, etc. If a user has not used the specific element for a week (for example), then the provisioning of that particular element to the specific user would expire. Step 92 retrieves that predetermined provisioning expiry-date. Step 93 then searches the subscriber database 74 to find a subscriber for which the difference between the current date and the last user date is greater than the provisioning expiry-date.

Process 90 then enters decision box 94 to determine whether such a subscriber is found. If a subscriber is found, then process 90 enters step 96 and sets the column of the subscriber in the 'provisioned' column in the subscriber database 74 to "NO". In other words, the subscriber is no longer provisioned for the particular service element. If after applying the de-provisioning policy rules to all subscribers and a subscriber is not found by decision box 94, however, then process 90 enters step 95 to select another subscriber, e.g., at random. Step 86 is entered and that randomly selected subscriber has the 'provisioned' column in the subscriber database 74 set to "NO". In this manner, the license count level or the subscriber count level is reduced by one. This makes room for the newly requesting subscriber to obtain service from the element, without exceeding the license count level or the subscriber count level. The license count level and the subscriber count level may be displayed by the SPM 25 to a network manager and provided as updates to the service database 75 and subscriber database 74 for accurate service cost management.

Figure 11A:
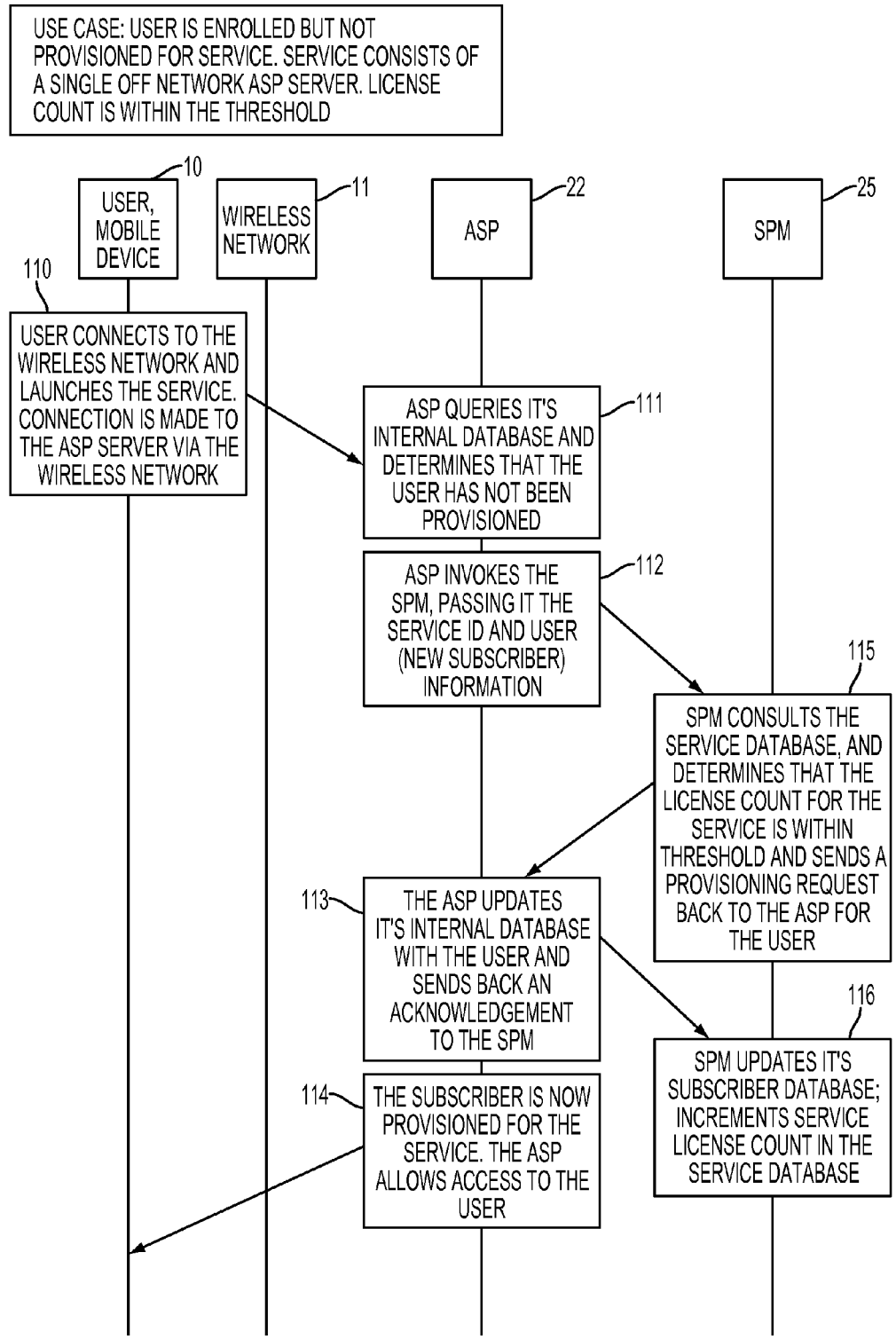
FIGS. 11A and 11B provide examples of timing interchanges between a user and an ASP server.
Figure 11B:
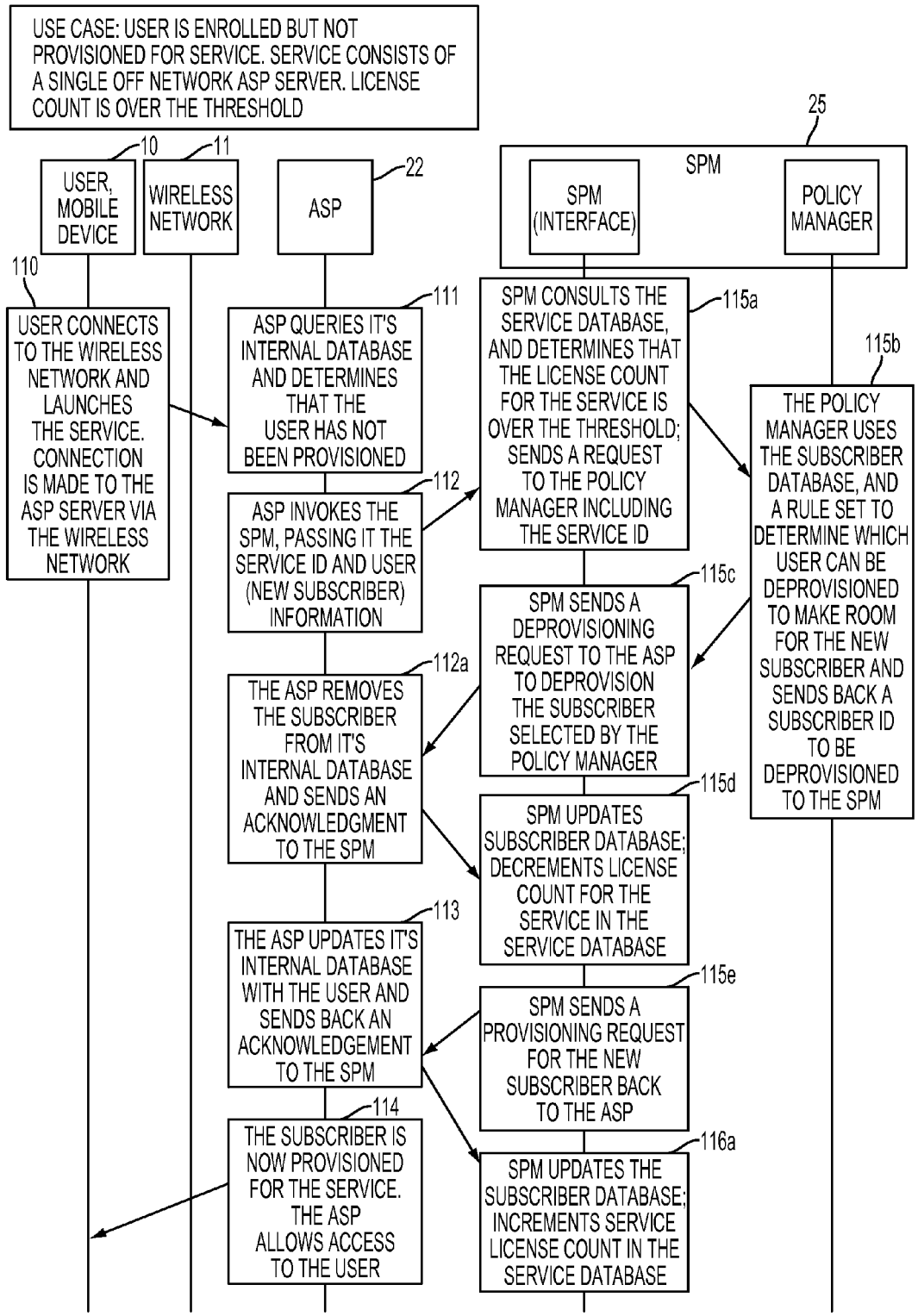

Referring next to FIGS. 11A and 11B, there are shown various elements of the IMS or Core Network 12 communicating with each other. Various steps and their timing relationships are included for a case in which the user is enrolled but not provisioned for service. Service includes a single off network ASP server and the license count is within the threshold.

As shown, a user connects to the wireless network and launches the service. Connection is made to the ASP 22 via the wireless network 11 (step 110). The ASP 22 queries its internal database and determines that the user has not been provisioned (step 111). The ASP invokes the SPM, passing it the Service ID and user (subscriber) information (step 112). The SPM 25 consults the Service Database, and determines that the license count for the service is within threshold and sends a provisioning request back to the ASP for the user (step 115). The SPM updates its Subscriber Database and increments service license count in the Service Database (step 116). The ASP 22 updates its internal database with the user and sends back an acknowledgment to the SPM 25 (step 113). The subscriber is now provisioned for the service and the ASP 22 allows access to the user (step 114).

Figure 9:
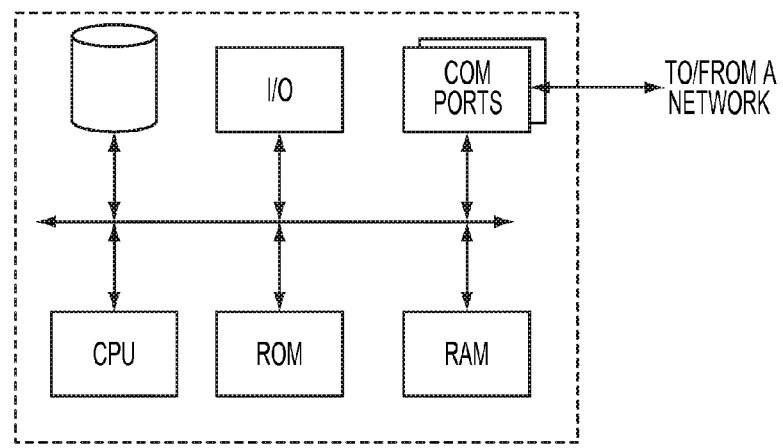
FIGS. 9 and 10 provide functional block diagram illustrations of general purpose computer hardware platforms.
Figure 10:
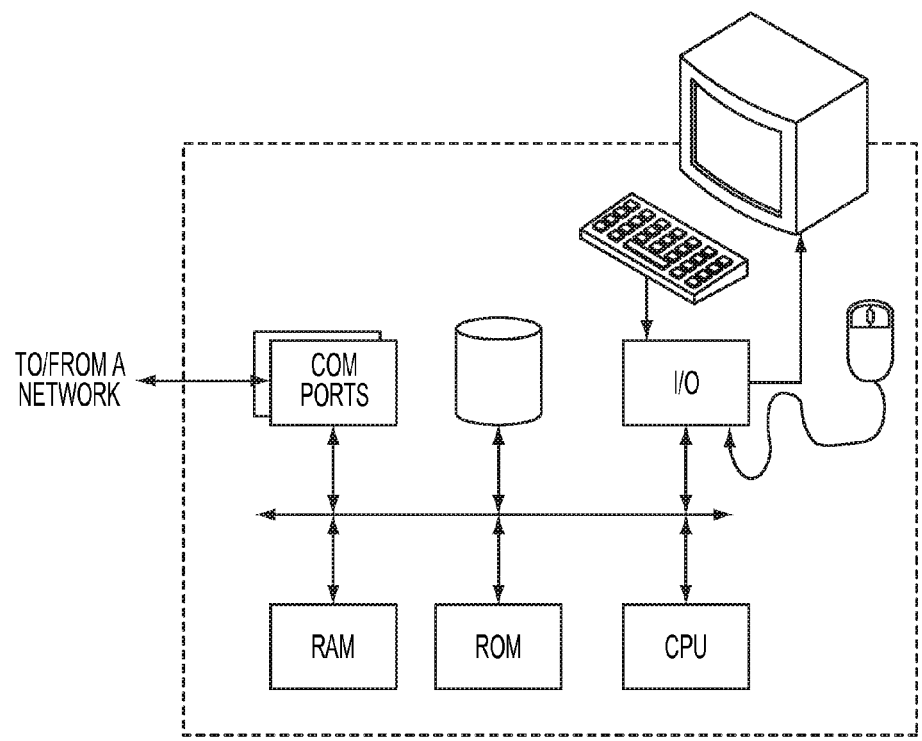

Referring last to FIGS. 9 and 10, there are shown functional block diagram illustrations of general purpose computer hardware platforms that can be used to implement a server and a database. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server, if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms to distribute the processing load.

A computer type user terminal device, such as a PC or tablet computer, similarly includes a data communication interface, CPU, main memory and one or more mass storage devices for storing user data and the various executable programs. A mobile device type user terminal may include similar elements, but typically uses smaller components that also require less power to facilitate implementation in a portable form factor. The various types of user terminal devices also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices are conventional in nature, and it is presumed that those skilled in the art are adequately familiar therewith.

Hence, aspects of the methods of enriching call records with other data outlined above and analyzing the data may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, or loading from a management server or host computer of the telephone service provider into the computer platform running the data preparation process. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as computer or machine readable medium refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement a database shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to the processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A method comprising:
activating, by a device of a wireless service provider in a wireless network, a service element for servicing a first user of a wireless device;
determining, by the device, that the service element is in-network of the wireless network;
determining, by the device and based on determining that the service element is in-network, a current license count on the service element;
provisioning, by the device, the service element for the first user based on determining that the current license count on the service element is below a threshold count level; and
forming, by the device and in a database, a record containing a subscriber identification (ID) associated with a wireless ID,
the wireless ID being associated with information identifying one or more service elements for providing a wireless service to which the first user is subscribed,
the one or more service elements including the service element, and
each of the one or more service elements being identified as in-network or out-of-network.

2. The method of claim 1, further comprising:
determining that the current license count on the service element is above the threshold count level; and
de-provisioning, based on determining that the current license count on the service element is above the threshold count level, the service element for at least one other user in order to lower the current license count to at most the threshold count level.

3. The method of claim 1, wherein determining that the service element is in-network includes:
determining that the service element is hosted by the wireless service provider; and
determining that the service element is licensed to the wireless service provider based on multiple tiers of subscriber quantities,
each tier of the multiple tiers having a different threshold count level.

4. The method of claim 1, further comprising:
determining that another service element is an out-of-network service element based on determining that the other service element is hosted by another service provider; and
determining that the wireless service provider is charged by the other service provider based on multiple grouping levels of subscribers,
each grouping level of the multiple grouping levels having a different threshold count level.

5. The method of claim 4, further comprising:
determining a current grouping level of subscribers, of the multiple grouping levels, for the other service element, the current grouping level of subscribers having a current count of subscribers; and
provisioning the other service element for the first user based on determining that the current count of subscribers on the other service element is below a particular threshold count level.

6. The method of claim 4, further comprising:
determining a particular threshold count level for the other service element; and
de-provisioning, based on determining that a current threshold count level on the other service element is above the particular threshold count level, the other service element for at least one other user in order to lower the current threshold count level to at most the particular threshold count level.

7. The method of claim 1, wherein provisioning the service element for the first user includes:
provisioning the service element for the first user based on receiving a request from the first user to provide the wireless service.

8. The method of claim 1, further comprising:
de-provisioning the service element for a second user before provisioning the service element for the first user.

9. The method of claim 1, wherein the record further includes one or more last-used dates,
each of the one or more last-used dates being associated with each of the one or more service elements, respectively, identified in the database,
the one or more last-used dates including a particular last-used date on which a particular service element was last used by a particular user.

10. The method of claim 9, further comprising:
de-provisioning the particular service element for the particular user based on determining that a difference between a current date and the particular last-used date is greater than an expiration time period.

11. A system comprising:
a device of a wireless service provider in a wireless network,
the device to:
activate a service element for servicing a first user of a wireless device;
determine, based on activating the service element, that the service element is in-network of the wireless network;
determine, based on determining that the service element is in-network, a number of subscribers of the service element;
provision the service element for the first user based on determining that the number of subscribers is below a threshold count level; and
form, based on provisioning the service element, a record in a database,
the record containing a subscriber identification (ID) associated with a wireless ID,
the wireless ID being associated with information identifying one or more service elements for providing a wireless service to which the first user is subscribed,
the one or more service elements including the service element, and
each of the one or more service elements being identified as in-network or out-of-network.

12. The system of claim 11, wherein the device is further to:
determine a first number of subscribers to define a tier of licensed subscribers of a first service element,
the tier defining a license fee to the wireless service provider, and
the first service element being in-network, and
determine a second number of subscribers belonging to a group of subscribers of a second service element,
the group defining a charge per subscriber to the wireless service provider, and
the second service element being out-of-network.

13. The system of claim 11, wherein the device, when provisioning the service element for the first user, is to:
provision the service element for the first user based on receiving a request from the first user to provide the wireless service.

14. The system of claim 11, wherein the device is further to:
de-provision the service element for a second user, and
provision the service element for the first user after de-provisioning the service element for the second user.

15. The system of claim 11, wherein the database includes flail one or more last-used dates,
each of the one or more last-used dates being associated with each of the one or more service elements, respectively, identified in the database,
the one or more last-used dates including a particular last-used date on which a particular service element was last used by a particular user, and
wherein the device is further to:
de-provision the particular service element for the particular user based on determining that a difference between a current date and the particular last-used date is greater than an expiration time period.

16. A non-transitory computer-readable medium storing instructions, the instructions comprising:
one or more instructions that, when executed by a processor of a device of a wireless service provider in a wireless network, cause the processor to:
activate a service element for servicing a first user of a wireless device;
determine that the service element is in-network of the wireless network;
determine, based on determining that the service element is in-network, a current license count on the service element; and
provision the service element for the first user based on determining that the current license count on the service element is below a threshold count level; and
form, in a database, a record containing a subscriber identification (ID) associated with a wireless ID,
the wireless ID being associated with information identifying one or more service elements for providing a wireless service to which the first user is subscribed,
the one or more service elements including the service element, and
each of the one or more service elements being identified as in-network or out-of-network.

17. The non-transitory computer-readable medium of claim 16, where the one or more instructions, that cause the processor to determine that the service element is in-network, cause the processor to:
determine that the service element is hosted by the wireless service provider; and
determine that the service element is licensed to the wireless service provider based on multiple tiers of subscriber quantities,
each tier of the multiple tiers having a different threshold count level.

18. The non-transitory computer-readable medium of claim 16, where the one or more instructions, when executed by the processor, further cause the processor to:
determine that another service element is an out-of-network service element based determining that on the other service element is hosted by another service provider; and
determine that the wireless service provider is charged by the other service provider based on multiple grouping levels of subscribers,
each grouping level of the multiple grouping levels having a different threshold count level.

19. The non-transitory computer-readable medium of claim 18, where the one or more instructions, when executed by the processor, further cause the processor to:
determine a current grouping level of subscribers, of the multiple grouping levels, for the other service element,
the current grouping level of subscribers having a current count of subscribers, and
provision the other service element for the first user based on determining that the current count of subscribers on the other service element is below a particular threshold count level.

20. The non-transitory computer-readable medium of claim 18, where the one or more instructions, when executed by the processor, further cause the processor to:
determine a particular threshold count level for the other service element, and
de-provision, based on determining that a current threshold count level on the other service element is above the particular threshold count level, the other service element for at least one other user in order to lower the current threshold count level to at most the particular threshold count level.

\* \* \* \* \*